Patented July 10, 1945

2,380,062

UNITED STATES PATENT OFFICE 2,380,062

CYANOMETHYL CROTONATES

David T. Mowry, Dayton, Ohio, assignor to Monsanto Chemical Company, St. Louis, Mo., a corporation of Delaware No Drawing. Application September 27, 1943,
Serial No. 504,049

4 Claims. (Cl. 260—464)

The present invention relates to new esters of glycolonitrile, more particularly to esters of glycolonitrile with crotonic acid or with beta-chlorocrotonic acid, and to methods of producing the same.

The invention has as an object the provision of useful, new esters of glycolonitrile. Another object of the invention is the preparation of new, unsaturated esters of glycolonitrile capable of forming copolymers for use in the plastic and coating industries. Still another object is the preparation of new insecticides and fungicides.

These objects are accomplished by the following invention wherein there are prepared unsaturated esters of glycolonitrile having the general formula:

$$CH_3.CR:CH.COO.CH_2CN$$

wherein R represents hydrogen or chlorine. Examples of compounds having the above general formula are cyanomethyl crotonate and cyanomethyl beta-chlorocrotonate.

The new esters are readily obtainable by reaction of crotonyl chloride or beta-chlorocrotonyl chloride with an aqueous mixture of sodium cyanide and formaldehyde substantially according to the equation:

$$CH_3.CR:CH.COX+NaCN+HCHO \rightarrow$$
$$CH_3.CR:CH.COO.CH_2.CN+NaX$$

wherein R stands for hydrogen or chlorine and X stands for halogen, i. e., chlorine, bromine, fluorine or iodine. Instead of the sodium cyanide, potassium cyanide may be used.

Cyanomethyl crotonate or cyanomethyl beta-chlorocrotonate are also obtainable by reaction of a crotonyl halide or a beta-chlorocrotonyl halide with glycolonitrile in the presence of an organic or inorganic base, according to the equation:

$$CH_3.CR:CH.COX+HO.CH_2.CN \rightarrow$$
$$CH_3.CR:CH.COO.CH_2.CN+HX$$

wherein X stands for halogen and R stands for hydrogen or chlorine.

Still another method for the preparation of cyanomethyl crotonate or cyanomethyl beta-chlorocrotonate involves the dehydrohalogenation of cyanomethyl alpha-chlorobutyrate or cyanomethyl beta-chlorobutyrate, for example, by heating in the presence of quinoline or another basic reacting organic or inorganic compound, according to the equation:

$$CH_3.CCIR.CH_2.COO.CH_2CN \xrightarrow{base}$$
$$CH_3.CR:CH.COO.CH_2.CN+HCl$$

wherein R stands for hydrogen or chlorine.

Cyanomethyl crotonate and cyanomethyl beta-chlorocrotonate are of interest as fungicides and insecticides, the latter compound being especially valuable for this purpose. The new esters are also of interest as intermediates in the preparation of dyestuffs, surface-active agents, for example, synthetic detergents and wetting agents, water-proofing and fire-proofing materials, etc.

Both the crotonate and the chlorocrotonate copolymerize with aliphatic diolefinic hydrocarbons or their derivatives, for example, butadiene, isoprene and chloroprene, to yield valuable rubbery products of high thermal stability and good elasticity. Such products are described and claimed in copending application Serial No. 504,045, filed September 27, 1943, in the name of Raymond B. Seymour and David T. Mowry.

While a number of saturated esters of glycolonitrile are known, as far as I have been able to ascertain, unsaturated esters of glycolonitrile have not been previously prepared. Glycolonitrile, itself, polymerizes rather rapidly to a colorless, crystalline mass, and in the prior art its esters were generally prepared by indirect methods, i. e., glycolonitrile was not employed as a constituent of the reaction mixture in reactions involving the preparation of its esters. For example, Henry (Bull. soc. chim. (2) 46, 42; Rec. trav. chim. 24, 170), prepared the acetate, the propionate and the butyrate of glycolonitrile by reaction of chloroacetonitrile with the potassium salt of acetic acid, propionic acid or butyric acid, respectively. In the preparation of the benzoate of glycolonitrile, the nitrile was formed in situ, benzoyl chloride being reacted with a mixture of potassium cyanide and formaldehyde instead of with glycolonitrile (J. Aloy and C. Rabaut. Bull. soc. chim. (4) 13, 457–460). Only in the preparation of the carbonates has glycolonitrile been previously employed as an esterifiable alcohol. In U. S. Patents Nos. 2,266,199 and 2,307,679, Hechenbleikner reacts glycolonitrile with phosgene to obtain glycolonitrile dicarbonate or cyanomethyl chloroformate, respectively. It is well known, however, that phosgene is an especially reactive acyl halide and that its reactivity is not necessarily typical for other acyl halides. Since no acyl halide other than phosgene has been previously reacted with glycolonitrile to yield esters thereof, the production of unsaturated esters of glycolonitrile by reaction of the same with unsaturated acyl halides could not have been anticipated.

Also, although a saturated ester of glycolonitrile, i. e., the benzoate, has been previously prepared by reaction of the acyl halide with a mixture of an alkali metal cyanide and formaldehyde in aqueous solution, the course of a parallel reaction with an unsaturated, instead of a saturated, acyl halide could not have been predicted. Many unsaturated acyl halides are known to undergo auto-condensation or polymerization in the presence of alkaline reagents. Moreover, the production of complex cyanohydrins, instead of esters of glycolonitrile may have been expected to occur by addition of hydrogen cyanide at the olefinic double bonds of the unsaturated acyl halide. The production of unsaturated esters of glycolonitrile by reaction of an aqueous mixture of formaldehyde and an alkali metal cyanide with an unsaturated acyl halide consequently could not have been predicted.

The invention is further illustrated, but not limited, by the following examples:

Example 1

*Cyanomethyl crotonate.*—To 50 grams (0.52 mol, 45 cc.) of 37.1% formalin and 28 grams (0.55 mol) of 95% aqueous sodium cyanide in 300 cc. of water at a temperature of 10° C. there was added, with vigorous stirring, 52 grams (0.5 mol) of crotonyl chloride during a period of 30 minutes. The ice-bath, which had been used during the addition of the crotonyl chloride, was then removed and the temperature was allowed to rise to 20° C. while stirring for a period of one hour. At the end of this time the supernatant oil was extracted with ether, washed with an aqueous solution of sodium carbonate and then with dilute hydrochloric acid. Upon evaporation of the ether and distillation of the residue under partial vacuum there was obtained 28 grams of crude cyanomethyl crotonate, B. P. 103°–104° C./17 mm.

Following the same procedure, but employing greater amounts of reactants, i. e., 104 grams (1 mol) of crotonyl chloride, 60 grams (1.15 mols) of 95% sodium cyanide and 90 cc. (1.04 mols) of 37.1% formalin, there was obtained 75 grams (60% theoretical yield) of crude cyanomethyl crotonate, B. P. 103°–105° C./17 mm.

Upon combination of the crude products of the two runs and redistillation there was obtained 77 grams of substantially pure cyanomethyl crotonate, B. P. 67°–68° C./2 mm., $n_D^{25}$ 1.4482, and analyzing as follows:

|  | Percent C | Percent H | Percent N |
|---|---|---|---|
| Calcd. for $C_6H_7O_2N$ | 57.60 | 5.64 | 11.20 |
| Found | 57.81 | 5.92 | 11.38 |

Cyanomethyl crotonate is particularly valuable as a copolymerizing agent for butadiene, yielding copolymers having good thermal characteristics and elasticity.

Example 2

*Cyanomethyl beta-chlorocrotonate.*—Beta-chlorocrotonyl chloride, B. P. 130°–138° C. was obtained by reaction of phosphorus pentachloride on acetoacetic ester. 51 grams (0.37 mol) of beta-chlorocrotonyl chloride was added dropwise to a mixture consisting of 23 grams (0.4 mol) of 95% aqueous sodium cyanide in 200 cc. of water and 38 grams (35 cc., 0.38 mol) of 37.1% formalin at a temperature of 5°–10° C. and with vigorous stirring. After addition was complete, the mixture was warmed to room temperature and stirred for an additional 30 minutes. The lower ester layer was taken up with three volumes of ether and washed with sodium carbonate solution and dilute hydrochloric acid. Upon evaporation of the ether and distillation of the residual oil under vacuum there was obtained 31 grams (53% yield) of substantially pure cyanomethyl beta-chlorocrotonate, B. P. 116° C./16 mm., $n_D^{25}$ 1.4797, and analyzing as follows:

|  | Percent C | Percent H | Percent N |
|---|---|---|---|
| Calcd. for $C_6H_6O_2NCl$ | 45.15 | 3.78 | 8.98 |
| Found | 45.37 | 3.87 | 8.64 |

Since beta-chlorocrotonyl chloride, prepared from phosphorus pentachloride and acetoacetic ester, is known to give the iso-meta-chlorocrotonamide (Autenrieth. Ber. 29, 1667 (1896)), the cyanomethyl beta-chlorocrotonate obtained in this example is probably the iso compound.

While I prefer to use acyl halides in the preparation of cyanomethyl crotonate or cyanomethyl beta-chlorocrotonate by reaction with a mixture of an alkali metal cyanide and formaldehyde, I may also use the corresponding acid anhydrides. However, in this case, the reaction is preferably conducted under anhydrous conditions, employing the acid anhydride in excess in order to act as diluent and using gaseous formaldehyde instead of formalin. In working under anhydrous conditions, hydrogen cyanide may be used instead of the alkali metal cyanide. Hydrogen cyanide may also be substituted for the alkali metal cyanide, wholly or in part, when reacting the unsaturated acyl halide or acid anhydride with an aqueous mixture of formalin and cyanide.

In preparing cyanomethyl crotonate or cyanomethyl beta-chlorocrotonate by reaction of the crotonyl halide or the beta-chlorocrotonyl halide with glycolonitrile, reaction is preferably effected in an inert solvent, for example, ether, chloroform, carbon tetrachloride, benzene, xylene, etc., and in the presence of a basic material such as quinoline, pyridine, dimethylaniline, morpholines, etc. Such inert solvents and basic materials are also useful in the preparation of the esters by dehydrohalogenation of cyanomethyl butyrate or cyanomethyl beta-chlorobutyrate, although in these instances the dehydrohalogenating reactions are preferably effected in the absence of diluents.

Esterification of glycolonitrile by reaction of the same with crotonic anhydride or beta-chlorocrotonic anhydride also provides a good method for the preparation of cyanomethyl crotonate or cyanomethyl beta-chlorocrotonate.

While the forms of invention disclosed herein constitute preferred embodiments thereof, it is to be understood that the invention is not limited to these precise forms, and that changes may be made therein without departing from the scope of the invention which is defined in the appended claims.

What I claim is:
1. Compounds of the formula:

$$CH_3CR:CH.COO.CH_2CN$$

where R is a member of the group consisting of hydrogen and chlorine.
2. Cyanomethyl crotonate.
3. Cyanomethyl beta-chlorocrotonate.
4. The process which comprises reacting a compound having the formula:

$$CH_3.CR:CHCOX$$

where R is a member of the group consisting of hydrogen and chlorine and X is halogen, with glycolonitrile in an inert solvent.

DAVID T. MOWRY.